United States Patent
Charters et al.

(10) Patent No.: US 10,628,183 B2
(45) Date of Patent: *Apr. 21, 2020

(54) STATE SYNCHRONIZED INTERACTIVE SOFTWARE DEMONSTRATION

(71) Applicant: International Business Machines Corporation, Armonk, NY (US)

(72) Inventors: Graham C. Charters, Waltham Chase (GB); Bret W. Dixon, South Perth (AU); Benjamin T. Horwood, North Perth (AU); Alexander H. Poga, Peppermint Grove (AU); Mark A. Shewell, Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,455

(22) Filed: Jan. 18, 2017

(65) Prior Publication Data

US 2017/0344386 A1 Nov. 30, 2017

Related U.S. Application Data

(63) Continuation of application No. 15/168,277, filed on May 31, 2016.

(51) Int. Cl.
*G06F 9/451* (2018.01)
*H04L 29/08* (2006.01)
*H04L 29/06* (2006.01)
*G06F 9/455* (2018.01)

(52) U.S. Cl.
CPC .......... *G06F 9/453* (2018.02); *G06F 9/45533* (2013.01); *G06F 9/45558* (2013.01); *H04L 67/02* (2013.01); *H04L 67/025* (2013.01); *H04L 67/04* (2013.01); *H04L 67/34* (2013.01); *H04L 67/42* (2013.01); *G06F 2009/45575* (2013.01); *H04L 67/10* (2013.01)

(58) Field of Classification Search
CPC ........ H04L 67/34; H04L 67/025; H04L 67/42
USPC ...................................................... 709/228
See application file for complete search history.

(56) References Cited

U.S. PATENT DOCUMENTS

| 8,490,083 | B1 | 7/2013 | Perttunen |
| 8,566,718 | B1 | 10/2013 | O'Neill |
| 9,152,446 | B2 | 10/2015 | Ansel |

(Continued)

OTHER PUBLICATIONS

List of IBM Patents or Patent Applications Treated as Related; Filed herewith; 2 pages.

(Continued)

*Primary Examiner* — Meng Vang
(74) *Attorney, Agent, or Firm* — Alexa L. Ashworth; Edward J. Wixted, III; William H. Hartwell (57) ABSTRACT

Embodiments of the present invention provide systems and methods for interactive software demonstrations. While a presenter demonstrates software to the participants, the demonstration may be "paused" and "resumed." When paused, the participants are able to interact with the demonstrated software program. When "resumed," the participants are not able to interact with the demonstrated software program. Spawned virtual machines, wherein the virtual machines control access to the software program being demonstrated, permit participant interaction.

7 Claims, 6 Drawing Sheets

(56) References Cited

U.S. PATENT DOCUMENTS

| | | | |
|---|---|---|---|
| 2012/0204102 A1 | 8/2012 | Gwin et al. | |
| 2013/0007622 A1 | 1/2013 | Ke et al. | |
| 2013/0097603 A1* | 4/2013 | Amano | G06F 9/4843 718/1 |
| 2013/0283160 A1* | 10/2013 | Ball | H04L 65/605 715/716 |
| 2014/0025827 A1* | 1/2014 | Konuk | H04L 67/10 709/226 |
| 2014/0170978 A1* | 6/2014 | Wolman | G06F 9/54 455/41.2 |
| 2015/0009222 A1* | 1/2015 | Diard | G06F 9/45533 345/505 |
| 2015/0012973 A1* | 1/2015 | Derrin | G06F 9/45533 726/4 |
| 2015/0025964 A1 | 1/2015 | Awati | |
| 2015/0227290 A1* | 8/2015 | Lewis | G06F 3/04842 715/716 |
| 2016/0062780 A1* | 3/2016 | Young | G06F 9/45558 718/1 |
| 2016/0191604 A1* | 6/2016 | AbiEzzi | H04L 67/025 715/740 |
| 2016/0378528 A1* | 12/2016 | Zamir | G06F 9/45558 711/162 |

OTHER PUBLICATIONS

Myers et al.; "Creating Highly-Interactive and Graphical User Interfaces by Demonstration"; Proceedings of the 13th annual conference on Computer graphics and interactive techniques; SIGGRAPH '86; Aug. 18-22, 1986; pp. 249-258; vol. 20; No. 4; ACM.

Shearman et al.; "To Improve Signal Processing Concept Demonstration Software, Consider the Interactive Experience"; IEEE 13th Digital Signal Processing Workshop and 5th IEEE Signal Processing Education Workshop, 2009. DSP/SPE 2009; Jan. 4-7, 2009; pp. 227-231; © 2009 IEEE.

"Software Demos"; Skytap; Printed Mar. 16, 2016; 3 pages; Copyright © 2016 Skytap, Inc.; <https://www.skytap.com/solutions/more-solutions/software-demos/>.

"Understanding Clones"; VMware Workstation 5.5; Printed Mar. 16, 2016; 2 pages; Copyright © 2016 VMware, Inc.; <https://www.vmware.com/support/ws55/doc/ws_clone_overview.html>.

Charters et al.; U.S. Appl. No. 15/168,277, filed May 31, 2016; Entitled "State Synchronized Interactive Software Demonstration".

* cited by examiner

STATE SYNCHRONIZED INTERACTIVE SOFTWARE DEMONSTRATION

BACKGROUND OF THE INVENTION

The present invention relates generally to the field of client-server computing, and more specifically to interactive software demonstrations.

Software application education demonstrations often include the following: (i) a presenter and participant(s); (ii) the participant(s) join a conference call or a web conference; (iii) displaying the desktop contents on the computing device of the presenter; (iv) the opening of a software application to be demonstrated to the participant(s); and (v) the enactment of a sequence of preordained steps which utilize the software application. The presenter may also provide further content to the participant(s) with the aid of a slideshow or a keynote presentation. However, during the course of these software application education demonstrations, often the participant(s) are unable to interact with the software, and passively view the sequence of preordained steps which utilize the software application.

SUMMARY

According to one embodiment of the present invention, a method for interactive software demonstrations is provided with the method comprising the steps of: responsive to an initiation of a software demonstration, facilitating, by one or more processors, the software demonstration between a first device and a second device using at least one virtual machine; and wherein a software demonstration system allows one or more users of the second device to interact with the software demonstration system in parallel of a user of the first device and one or more users of the second device.

Another embodiment of the present invention provides a computer program product for interactive software demonstrations, based on the method described above.

Another embodiment of the present invention provides a computer system for interactive software demonstrations, based on the method described above.

DETAILED DESCRIPTION

Participants during a software application education demonstration are able to view the software application and ask questions to the presenter. However during such a software application education demonstration, the participants are: (i) unable to interact with the software application as the presenter is utilizing the software application during the demonstration; or (ii) unable to explore the various states of the software application at various points of time. Many times during these software education application demonstrations, the participants may benefit greatly from investigating the various states of the software application in order to obtain greater understanding of, familiarity with, and experience using the software application. Embodiments of the present invention disclose methods and systems for software application education demonstrations wherein: (i) virtual machines are employed, the demonstrated software is only present and run inside of the virtual machines, and a software demonstration module controls the employed virtual machines; and (ii) user interface events are replayed and each participant's computing device has a local copy of the software being demonstrated.

Figure 1A:
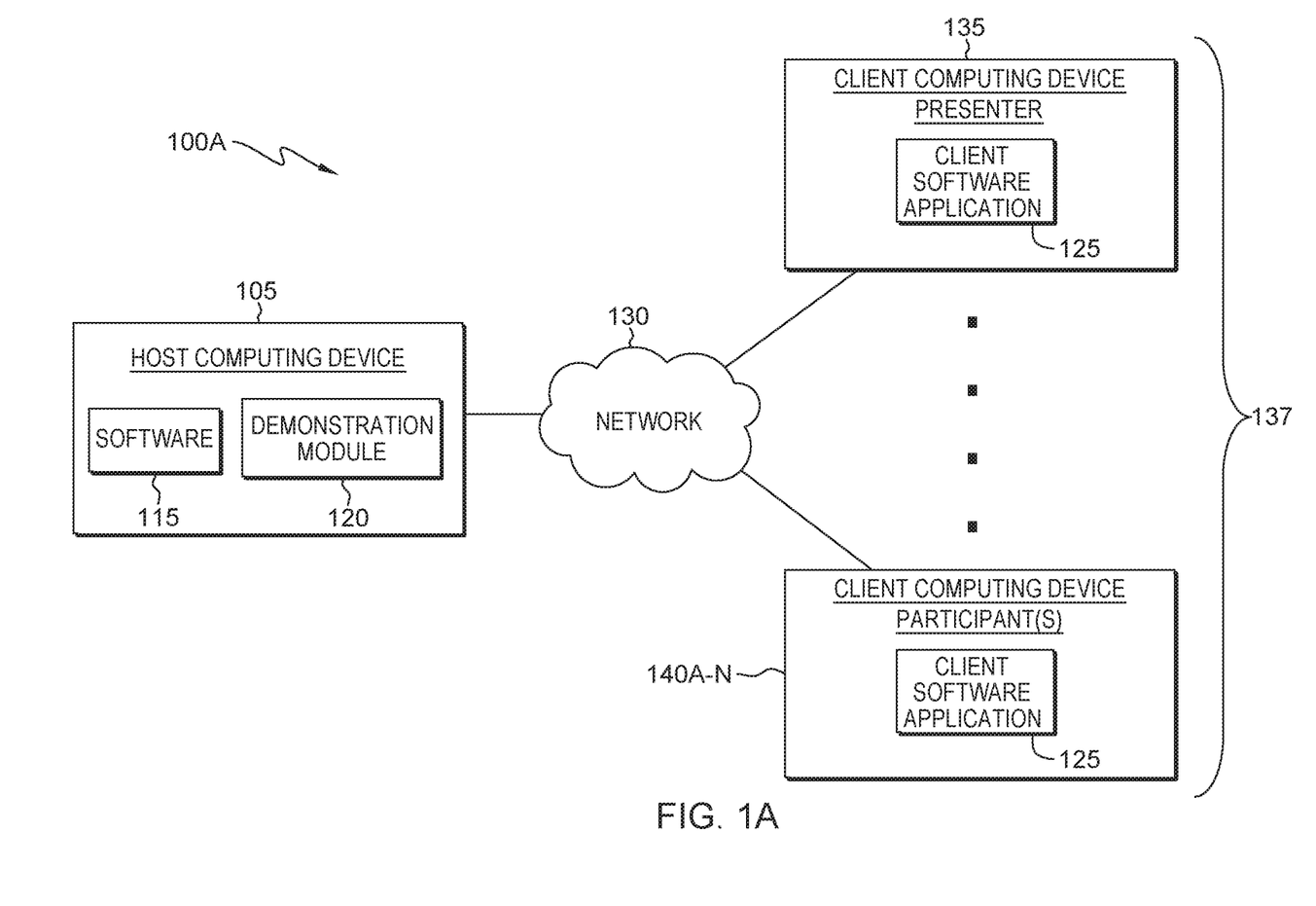
FIG. 1A is a functional block diagram illustrating a data processing environment, in accordance with an embodiment of the present invention.
Figure 1B:
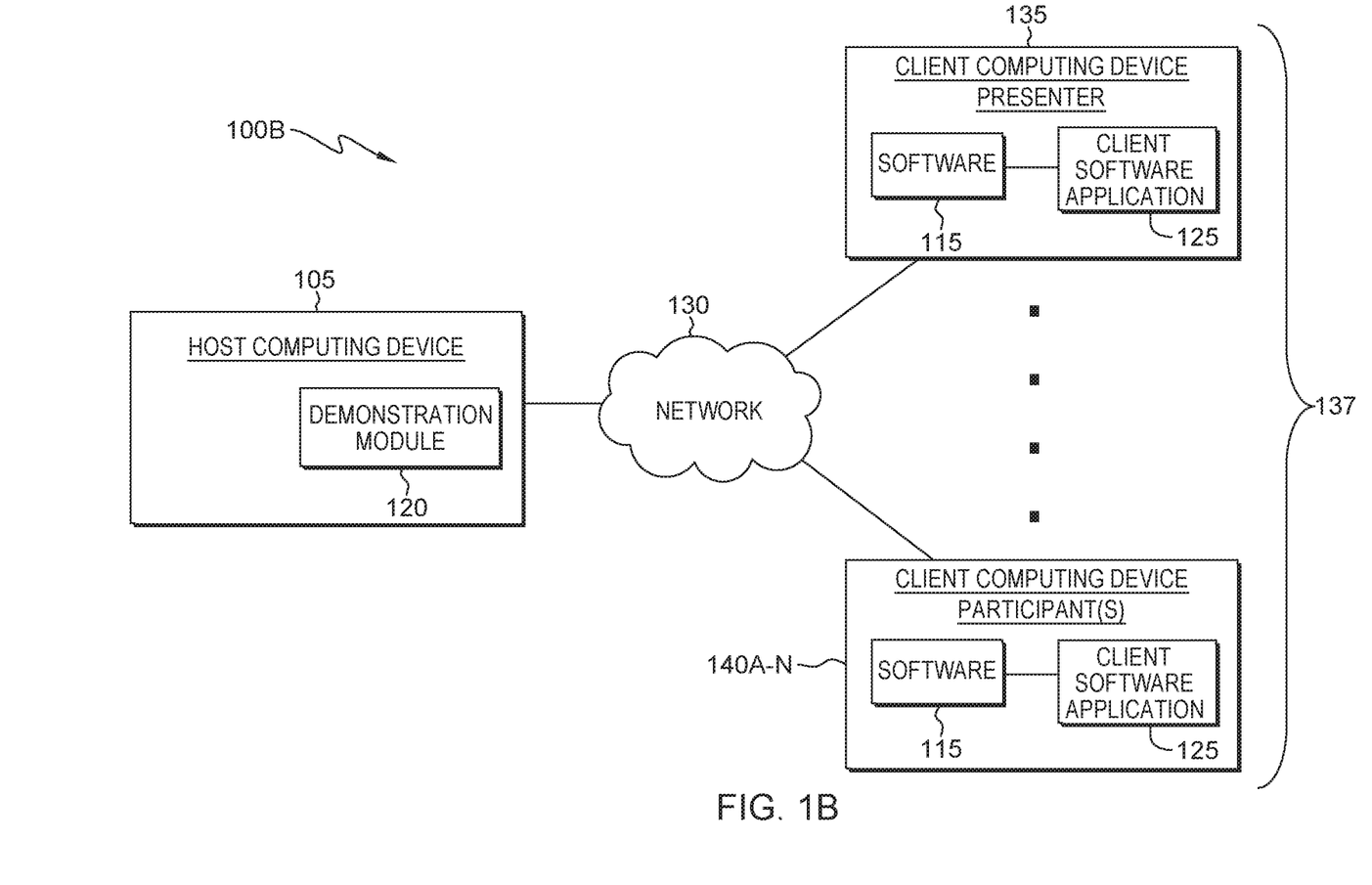
FIG. 1B is a functional block diagram illustrating a data processing environment, in accordance with another embodiment of the present invention.

The present invention will now be described in detail with reference to the Figures. FIG. 1A is a functional block diagram illustrating a data processing environment, generally designated 100A, in accordance with one embodiment of the present invention. FIG. 1A provides only an illustration of implementation and does not imply any limitations with regard to the environments in which different embodiments may be implemented. FIG. 1B is a functional block diagram illustrating a data processing environment, in accordance with another embodiment of the present invention. Modifications to data processing environments 100A and 100B may be made by those skilled in the art without departing from the scope of the invention as recited by the claims. In this exemplary embodiment, data processing environments 100A and 100B include host computing device 105, client computing device 135, and client computing devices 140A-N, connected by network 130.

In FIG. 1A and FIG. 1B, a presenter is giving a demonstration on a software application to participant(s) who are viewing the demonstration for educational purposes. The presenter and the participant(s) utilize computing resources within client computing cluster 137 wherein client computing cluster 137 contains client computing device 135 and client computing devices 140A-N. The one or more participants are using client computing devices 140A-N whereas the presenter is using client computing device 135. Client computing cluster 137 is connected to host computing device 105 via network 130.

Note: In FIG. 1A and FIG. 1B, the notation of "client computing devices 140A-N" implies there are multiple units of client computing device 140 wherein a single unit of "client computing devices 140A-N" is denoted as "client computer device 140". There is a more detailed description of client computing devices 140A-N in the text below.

In FIG. 1A, host computing device 105 is a server device. Host computing device 105 shares data and resources with clients. Demonstration module 120 resides within host computing device 105. Demonstration software 115 resides within a virtual machine created by demonstration module 120. Host computing device 105 may take the form of a laptop computer, a tablet computer, a netbook computer, a personal computer (PC), a desktop computer, a personal digital assistant (PDA), a smart phone, a thin client, or any programmable electronic device capable of communicating with client computing device 135 and client computing devices 140A-N. Host computing device 105 may include internal and external hardware components, as depicted and described in further detail with respect to FIG. 6. This invention can be described in terms of the client-server model wherein the clients are client computing device 135 and client computing devices 140A-N and the server is host computing device 105. In one embodiment, host computing device 105 is a server computer which serves its own computer programs. In other embodiments, host computing device 105 can be used for application servers (which host web apps); catalog servers (which maintain an index of information); communication servers (which maintain an environment facilitating communication between two or more endpoints); and proxy servers (which act as an intermediary between a client and a server). Host computing device 105 may provide different functionality in other scenarios depending on the needs of client computing device 135 and client computing devices 140A-N.

In FIG. 1B, host computing device 105 is a server device. Host computing device 105 shares data and resources with clients. In FIG. 1B, demonstration module 120 resides within host computing device 105. In the FIG. 1B embodiment, a copy of software 115 resides in all units of the client computing devices. Host computing device 105 may take the form of a laptop computer, a tablet computer, a netbook computer, a personal computer (PC), a desktop computer, a personal digital assistant (PDA), a smart phone, a thin client, or any programmable electronic device capable of communicating with client computing device 135 and client computing devices 140A-N. Host computing device 105 may include internal and external hardware components, as depicted and described in further detail with respect to FIG. 6. This invention can be described in terms of the client-server model wherein the clients are client computing device 135 and client computing devices 140A-N and the server is host computing device 105. In one embodiment, host computing device 105 is a server computer which serves its own computer programs. In other embodiments, host computing device 105 can be used for application servers (which host web apps); catalog servers (which maintain an index of information); communication servers (which maintain an environment facilitating communication between two or more endpoints); and proxy servers (which act as an intermediary between a client and a server). Host computing device 105 may provide different functionality in other scenarios depending on the needs of client computing device 135 and client computing devices 140A-N.

In FIG. 1A, software 115 is a computer program designed to perform a group of coordinated functions, tasks, or activities for the benefit of the user of software 115. Examples of software 115 include (but not limited to): word processors, spreadsheets, accounting applications, web browsers, media players, photo editors, and simulation programs. In FIG. 1A, software 115 resides in host computing device 105 and is demonstrated by a presenter (i.e., the user of client computing device 135) to the participants (i.e., the users of client computing devices 140A-N). In FIG. 1A, there is no local copy of software 115 installed on client computing devices 140A-N. Software 115 is only present and run inside the virtual machines, which are controlled by demonstration module 120.

In FIG. 1B, software 115 is a computer program designed to perform a group of coordinated functions, tasks, or activities for the benefit of the user of software 115. Examples of software 115 include (but not limited to): word processors, spreadsheets, accounting applications, web browsers, media players, photo editors, and simulation programs. In FIG. 1B, software 115 resides in client computing device 135 and client computing devices 140A-N and is demonstrated by a presenter (i.e., the user of client computing device 135) to the participants (i.e., the users of client computing devices 140A-N). In FIG. 1B, there is a copy of software 115 on each of the participant's client computing device 140. Demonstration module 120 achieves synchronization by triggering the replay of GUI events across all of the local copies of software 115.

In FIG. 1A and FIG. 1B, demonstration module 120 is a software application which resides in host computing device 105 and manages virtual machines. (Note: Demonstration module 120 within host computing device 105 is a different software program from client software application 125 in client computing devices 135 and in client computing devices 140A-N.) Demonstration module 120 accepts connections to client computing device 135 (which is being utilized by the presenter) and client computing devices 140A-N (which are being utilized by the participants). Demonstration module 120 is compatible with client software application 125 (which is a virtual machine client). Demonstration module 120 spawns, clones, and controls virtual machine images. During demonstrations, demonstration module 120 enables state-synchronized software demonstrations of software 115. Software 115 may be in presentation mode. Participants (who are viewing the demonstration of software 115) are able to interact with software 115 in parallel of the presenter and other participant(s) via demonstration module 120. Additionally, demonstration module 120 allows switching between the interactive mode and the non-interactive mode for each participant, either individually or en masse, via a signal from the presenter or a signal from the participants. The demonstration of software 115 is given by the presenter (i.e., the user of client computing device 135). The presenter can share desktop content as the presenter demonstrates software 115 for educational purposes. Demonstration module 120 allows the participants (using client computing devices 140A-N) to: (i) interrupt or pause a demonstration of software 115; (ii) take control of the participants' copy of the state synchronized version of software 115; (iii) and resume watching the demonstration of software 115. Further functionalities enabled by demonstration module 120 allow a participant (using client computing devices 140A-N) to explore: (i) various state dialogs (user interface components which display different information on client software application 125 and/or software 115); (ii) the effects of inputting different key combinations; and/or (iii) software 115 in a way which may help the participant become more familiar with software 115. Such exploration of software 115 may help alleviate or eliminate concerns of a participant (e.g., "what happens if I . . . " or "what is this button?").

In FIG. 1A and FIG. 1B, network 130 can be, for example, a local area network (LAN), a wide area network (WAN) such as the Internet, or a combination of the two, and can include wired, wireless, or fiber optic connections. In general, network 130 can be any combination of connections and protocols that will support communication between host computing device 105, client computing device 135, and client computing devices 140A-N.

In FIG. 1A and FIG. 1B, client computing device 135 and client computing devices 140A-N are used by the presenter of a demonstration of software 115 and the participants viewing the demonstration of software 115, respectively. There must be a connection between client computing device 135 and client computing devices 140A-N in order to permit communication between the client device units. Client computing device 135 and client computing devices 140A-N are client computing device units contained within client computing cluster 137, wherein client software application 125 resides within each client computing device unit. Client computing device 135 and client computing devices 140A-N may be a laptop computer, a tablet computer, a netbook computer, a personal computer (PC), a desktop computer, a personal digital assistant (PDA), a smart phone, a thin client, or any programmable electronic device capable of communicating with host computing device 105. Client computing device 135 and client computing devices 140A-N are essentially a virtual machine client with additional user interface features (see the discussion below). Client computing device 135 and client computing devices 140A-N may include internal and external hardware components, as depicted and described in further detail with respect to FIG. 6.

In FIG. 1A and FIG. 1B, client software application 125 is a virtual machine client residing on client computing device 135 and client computing devices 140A-N. In an exemplary embodiment of this invention, there are participants wanting to learn how to use software 115. A presenter is giving a demonstration on how to use software 115 and the participants are viewing the demonstration on how to use software 115. By using client software application 125, the user of one computing device or virtual machine is able to connect to another computing device or virtual machine. Client software application 125 contains user interface capability which facilitates communication between demonstration module 120, client computing device 135, and client computing devices 140A-N. The user interface capability may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. The user interface of client software application 125 is capable of receiving data, user commands, and data input modifications from a user and is capable of communicating with demonstration module 120. During the demonstration of software 115, the user interface facilitates transitions between the non-interactive mode and the interactive mode by displaying a "pause" button, which initiates the interactive mode and displaying a "resume" button, which initiates the non-interactive mode. Either the participants or the presenter can have access to the user interface capability of client software application 125 during a demonstration and thus, the participants or the presenter have the ability to both "pause" and "resume" the demonstration. (Either the participant or the presenter has the capability to "pause" and "resume" the demonstration at a given time.) Through the user interface of client software application 125 on client computing device 135 and client computing devices 140A-N, the demonstration of software 115 can be "paused" and "resumed" by either the presenter or participants wherein the presenter or the participants control access to the "pause" button and the "resume" button.

Figure 2:
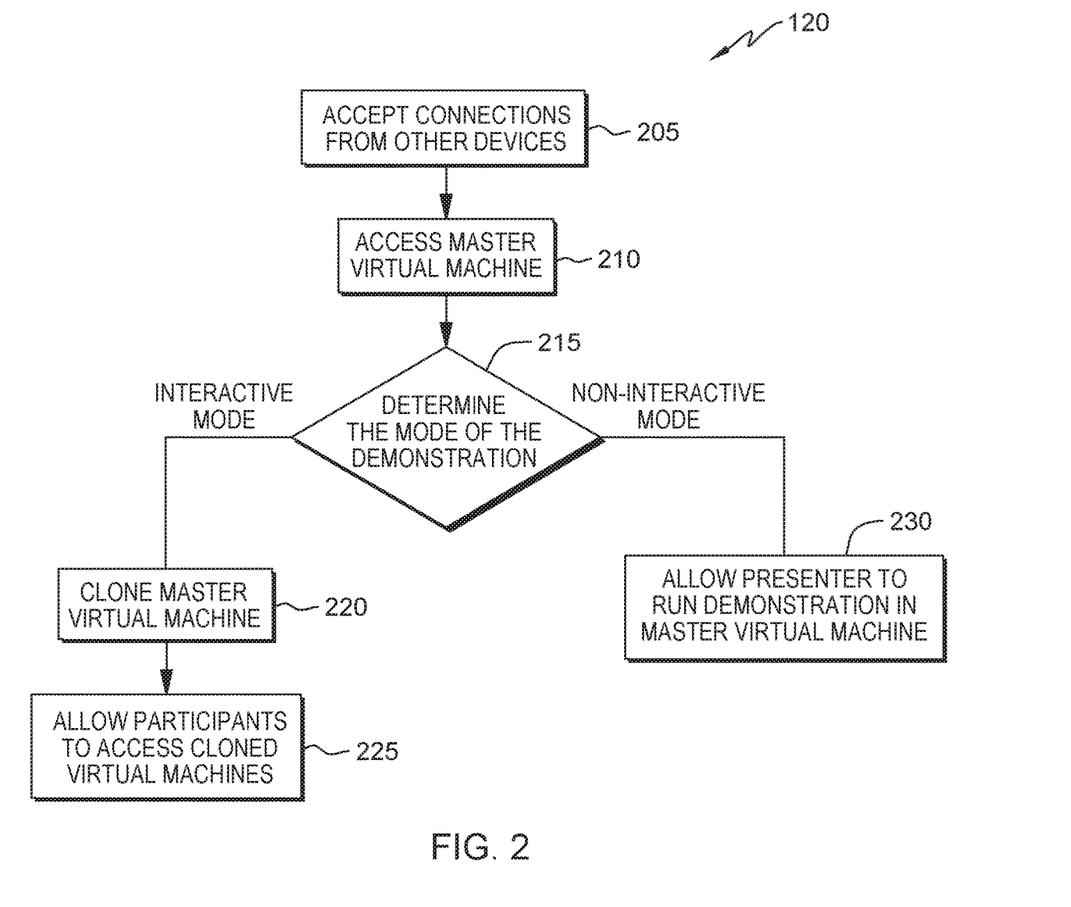
FIG. 2 is a flowchart depicting the operational steps of demonstration module 120, in accordance with an embodiment of the present invention.

FIG. 2 is a flowchart depicting the operational steps of demonstration module 120, in accordance with an embodiment of the present invention.

Note: Client computing device 135 is assumed to be used by the presenter. Client computing devices 140A-N are assumed to be used by the participants. Software 115 is assumed to be demonstrated by the presenter to the participants.

In step 205, demonstration module 120 accepts connections from other devices. These other devices are client computing device 135 and client computing devices 140A-N. Demonstration module 120 is compatible with the units of client software application 125 residing within client computing device 135 and client computing devices 140A-N. Furthermore, demonstration module 120 accepts data inputs from client software application 125. In terms of the server-client model, client software application 125 acts as a remote access client connected to host computing device 105, which is acting as the server. Software 115 is run inside the virtual machines spawned by demonstration module 120. Once client computing device 135 and client computing devices 140A-N are connected, the demonstration may begin in demonstration module 120.

In step 210, demonstration module 120 accesses the master virtual machine. In this embodiment, the demonstration has commenced as one connection is accepted from client computing device 135 and a second connection is accepted from client computing devices 140A-N. The presenter logs into a virtual machine image which is referred to as the master virtual machine. At this stage of the demonstration given by the presenter to the participants, client software application 125 is acting as a streaming media browser and demonstration module 120 is streaming the screen of the master virtual machine as a video. These virtual machine components applied during the course of the demonstration enables the non-interactive mode of the demonstration, interactive mode of the demonstration, and the switching between these two modes.

In step 215, demonstration module 120 determines the mode of the demonstration. The demonstration may be in the non-interactive mode or the interactive mode. The presenter runs the demonstration of software 115 in the master virtual machine while and the participants simply watch a screen feed of the demonstration. A "pause" button and a "resume" button control whether the demonstration is in the non-interactive mode or the interactive mode. Demonstration module 120 not only determines the mode of the invention but also permits swapping between the interactive mode and non-interactive mode. The switching process is described in more detail with respect to FIG. 3

In one embodiment, the presenter controls the "pause" button and the "resume" button. The presenter activates the "pause" button displayed in client software application 125 residing in client computing device 135 in order to allow the participants to explore software 115. Prior to the presenter activating the "pause" button, the demonstration is in the non-interactive mode. After the presenter activates the "pause" button, the demonstration is in the interactive mode. At some point, the presenter wants to recommence the demonstration and activates the "resume" button. Prior to the presenter activating the "resume" button (and after activating the "pause" button), the demonstration is in the interactive mode. After the presenter activates the "resume" button, the demonstration is in the non-interactive mode.

In another embodiment, the participants control the "pause" displayed in the client software application 125 button and the "resume" button. The participants activate the "pause" button in displayed in client software application 125 residing in client computing devices 140A-N in order to allow the participants to explore software 115. Prior to the participants activating the "pause" button, the demonstration is in the non-interactive mode. After the participant activates the "pause" button, the demonstration is in the interactive mode. At some point, the participant wants to recommence the demonstration and activates the "resume" button. Prior to the participants activating the "resume" button (and after activating the "pause" button), the demonstration is in the interactive mode. After the participants activate the "resume" button, the demonstration is in the non-interactive mode.

In step 220, demonstration module 120 clones the master virtual machine upon determining that the demonstration is in the interactive mode. In an embodiment where the presenter controls the "pause" button and the "resume" button, demonstration module 120 saves the master virtual machine and makes a separate copy of the master virtual machine available to each of the participants on client computing devices 140A-N. In another embodiment where the participants control the "pause" button and the "resume" button, activation of the "pause" button allows the participants to connect to a cloned virtual machine. The interactive state initiated upon the activation of the "pause" button does not interfere with or obstruct a participant's view of the demonstration of software 115 on client computing device 140 from another participant's view of the demonstration of software 115 on another client computing device 140. (Note: In this another embodiment, the cloned virtual machine is referred to as a cloned virtual machine slave.)

In step 225, demonstration module 120 allows the participants to access the cloned virtual machine. Each participant is now connected to the cloned virtual machines (which are cloned versions of the master virtual machine). By cloning the master virtual machine, client software application 125 on client computing device 140A-N may act as a fully-fledged virtual machine. Thus, the participants are now able to interact with a virtual machine image. Since the demonstration is in the interactive mode, each participant can interact with client software application 125 on client computing devices 140A-N.

In step 230, demonstration module 120 runs the demonstration in the master virtual machine upon determining that the demonstration is in the non-interactive mode. In one embodiment, the presenter may wish to resume the demonstration by switching back to the non-interactive mode from the interactive mode. When the demonstration switches back to the non-interactive mode, demonstration module 120 reloads the earlier saved image of the master virtual machine and access to the master virtual machine is given back to the presenter. Cloned virtual machines are destroyed and the participants are reconnected to the master virtual machine. By destroying the cloned virtual machines and the accompanying virtual machine image, the participants no longer have access to the virtual machine image associated with client computing devices 140A-N. A virtual machine image is now active on client computing device 135 and facilitates the non-interactive mode of the demonstration. Note: Cloned virtual machines are not hosted on the client computing devices. Rather, the cloned virtual machines are within demonstration module 120 (which is located on the host computing device 105). Furthermore, the cloned virtual machines are able to connect to the client software application 125, which is a virtual machine client.

Figure 3:
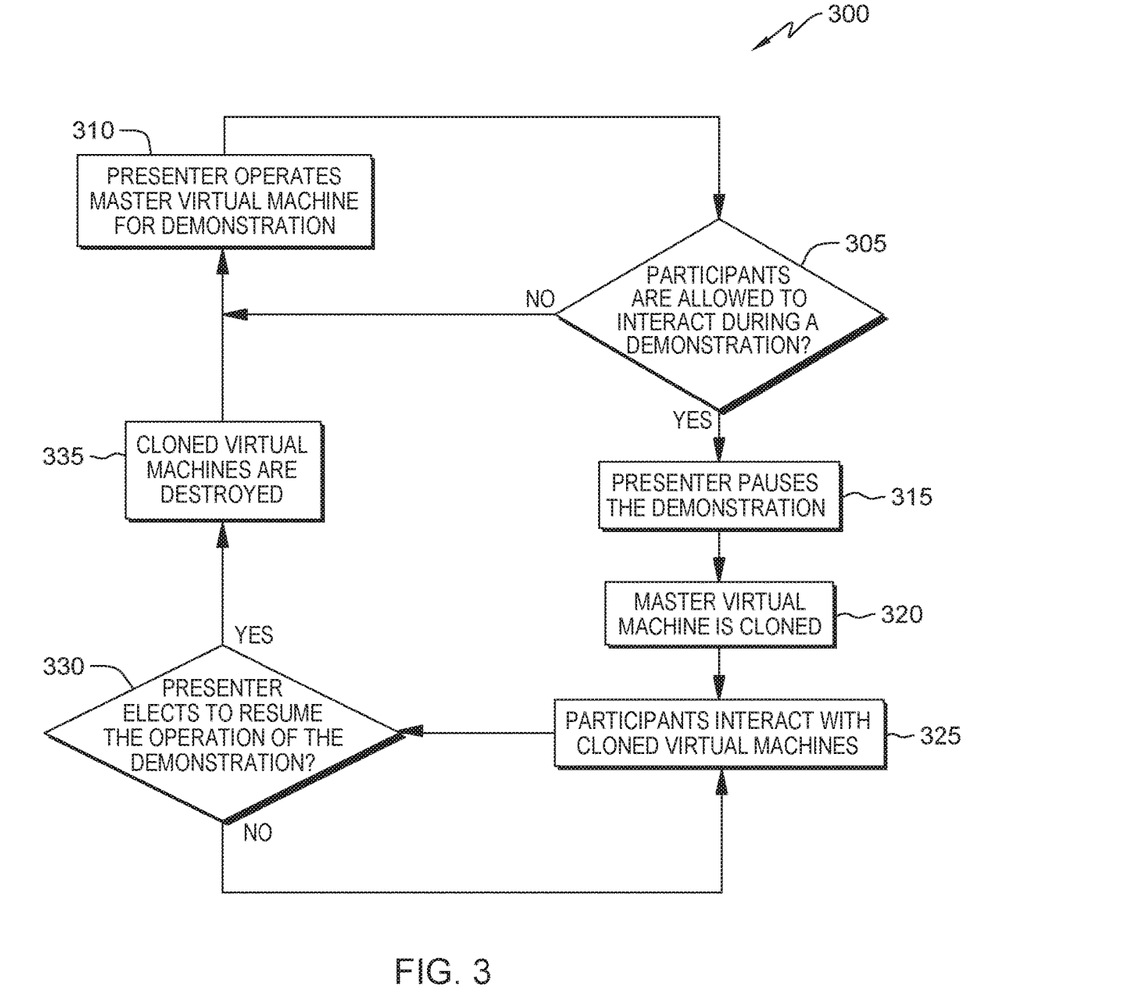
FIG. 3 is a flowchart depicting the operational steps involved in switching between a non-interactive mode and an interactive mode, in accordance with an embodiment of the present invention.

FIG. 3 is a flowchart depicting the operational steps of switching between a non-interactive mode and an interactive mode, in accordance with an embodiment of the present invention.

Client computing device 135 and client computing devices 140A-N are connected to demonstration module 120. Within client computing device 135 and client computing devices 140A-N, client software application 125 are able to communicate with demonstration module 120.

In step 305, demonstration module 120 determines if the participants are allowed to "interact" during the demonstration. During the non-interactive mode of a demonstration of software 115, the participants are unable to "interact" with the client software application 125. The presenter operates the master virtual machine for the demonstration. The presenter has access to the "pause" button and "resume" button displayed in client software application 125 within client computing device 135.

In step 310, the presenter operates the master virtual machine for the demonstration upon demonstration module 120 determining that the participants are not allowed to interact during a demonstration. Additionally, the presenter can resume operating the master virtual machine upon the presenter electing to resume the operation of the demonstration (see step 330) and demonstration module 120 destroying the virtual machines (see step 335). Furthermore, when the presenter resumes operating the master virtual machine, the sequence of operational steps are restarted as demonstration module 120 determines if participants are allowed to interact during a demonstration (see step 305).

In step 315, the presenter pauses the demonstration upon demonstration module 120 determining that the participants are allowed to "interact" during the demonstration. The presenter activates the "pause" button in order to enable the interactive mode. Thus, the non-interactive mode of step 305 is temporarily disabled.

In step 320, the master virtual machine is cloned. Demonstration module 120 may perform at least one of the following functionalities: (i) spawning virtual machines; (ii) managing the master virtual machine; (iii) cloning the master virtual machine to generate cloned virtual machines; and (iv) controlling the master virtual machine and the cloned virtual machines.

In step 325, the participants interact with the cloned virtual machines. The participants may remotely access the cloned virtual machines by interacting with the virtual machine image associated with the cloned virtual machines. In conjunction with the functionalities enabled by demonstration module 120, the participants can interact with client software application 125 while the demonstration of software 115 is in the interactive mode. Additionally, the participants may continue to interact with the cloned virtual machines upon demonstration module 120 determining that the presenter does not elect to resume operating the demonstration.

In step 330, demonstration module 120 determines if the presenter elects to resume the operation of the demonstration. In this embodiment, the presenter controls both the "pause" button and "resume" button. By activating the "pause" button, the demonstration in the interactive mode is implemented. In order to undo the implementation of the interactive mode (which was activated by the "pause" button), the presenter activates the "resume" button.

In step 335, the cloned virtual machines are destroyed upon demonstration module 120 determining that the presenter elects to resume the operation of the demonstration. The destruction of the cloned virtual machine triggers the reconnection of the participants to the desktop feed of the master virtual machine (on client computing device 135). The presenter resumes operating the virtual machine for demonstration. When demonstration module 120 destroys all of the cloned virtual machines, the accompanying virtual machine image of a cloned virtual machine is also destroyed. Thus, the participants are unable to access the virtual machine image which controls the master virtual machine or the cloned virtual machine. Furthermore, access to the virtual machine image is returned to the presenter, which resumes the demonstration to the state of the demonstration when the "pause" button was activated.

Figure 4:
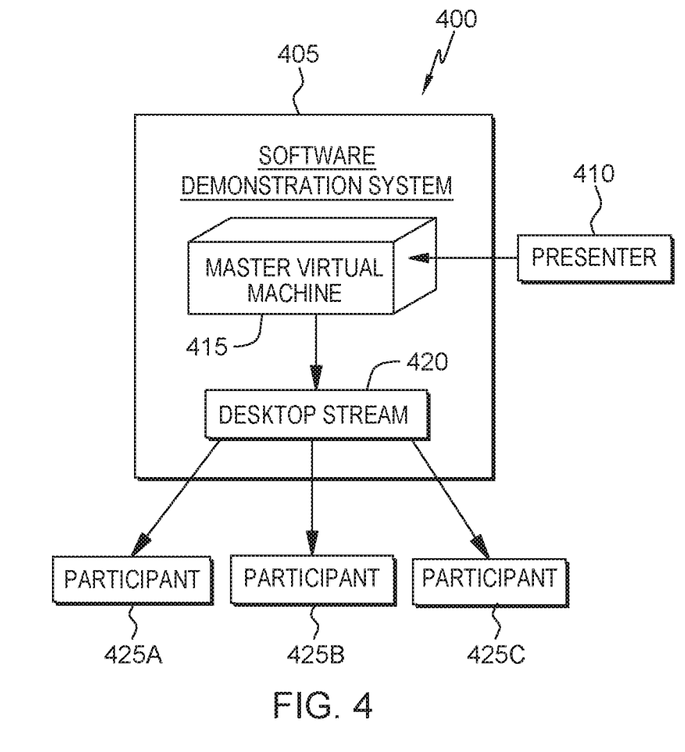
FIG. 4 is a functional block diagram illustrating a non-interactive mode, in accordance with an embodiment of the present invention.

FIG. 4 is a functional block diagram illustrating a non-interactive mode, in accordance with an embodiment of the present invention.

In this embodiment, the presenter controls the "pause" and "resume" buttons. Software demonstration system 405 depicts the state of demonstration module 120 while in the non-interactive mode. This non-interactive mode does not allow the participants to interact with software 115 independently of the presenter's actions. When a presenter activates the "pause" button, the participants can only access the cloned virtual machines. Presenter 410 accesses master virtual machine 415 as depicted by a single headed arrow pointing from presenter 410 to master virtual machine 415 in FIG. 4. Desktop stream 420 derives from master virtual machine 415 as depicted by a single headed arrow pointing from master virtual machine 415 to desktop stream 420. Master virtual machine 415 runs the demonstration which is displayed to participant 425A, participant 425B, and participant 425C using desktop stream 420. A single headed arrow pointing from desktop stream 420 to participants 425A-C, are depicted as such in FIG. 4, further illustrate participants 425A-C cannot access master virtual machine 415. The content of desktop stream 420 is fed directly to participants 425A-C while participants 425A-N do not (and cannot) feed content to desktop stream 420 and master virtual machine 415.

Figure 5:
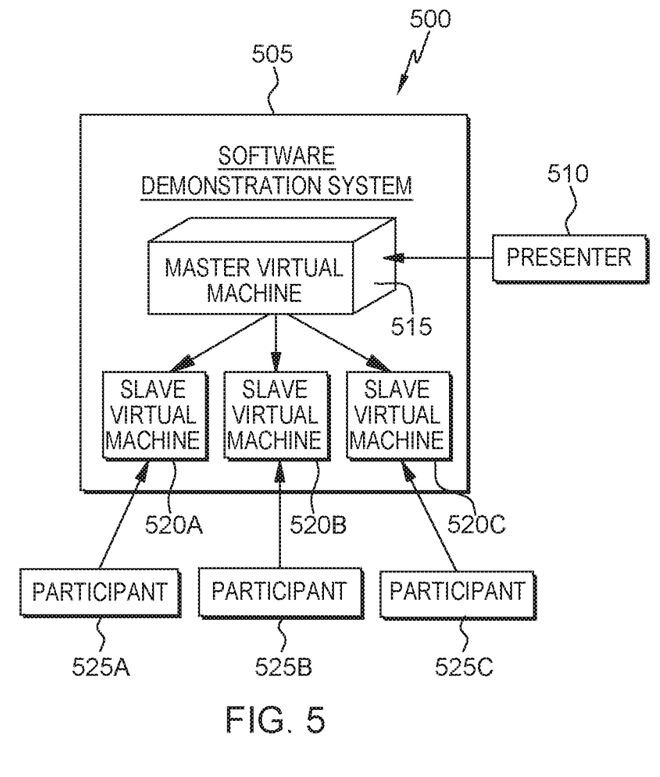
FIG. 5 is a functional block diagram illustrating an interactive mode, in accordance with an embodiment of the present invention.

FIG. 5 is a functional block diagram illustrating an interactive mode, in accordance with an embodiment of the present invention.

In this embodiment, the participants control the "pause" and "resume" buttons. Software demonstration system 505 depicts the state of demonstration module 120 while in the interactive mode. This allows the participants to interact with software 115 independently of the presenter's actions and without interfering with the other participants. When a participant, among the participants, activates the "pause" button, the participants can only access the cloned virtual machines. Presenter 510 accesses master virtual machine 515 as depicted by a single headed arrow pointing from presenter 510 to master virtual machine 515. The cloned virtual machines which derived from master virtual machine 515 are slave virtual machine 520A, slave virtual machine B, and slave virtual machine C as depicted by the singled headed arrows pointing from master virtual machine 515 to slave virtual machines 520A-C. Participant 525A can only access slave virtual machine 520A; participant 525B can only access slave virtual machine 520B; and participant 525C can only access slave virtual machine 520C. Presenter 510 does not access slave virtual machines 520A-C. A single headed arrow pointing only from each of participants 525A-C to each of slave virtual machines 520A-C, respectively, depicted as such in FIG. 5, further illustrates that the presenter does not access cloned virtual machines and slave virtual machines 520A-C do not interfere with each other. Accordingly, participant 525A is depicted as being linked only to slave virtual machine 520A; participant 525B is depicted as being linked only to 520B; and participant 525C is depicted as being linked only 520C.

Figure 6:
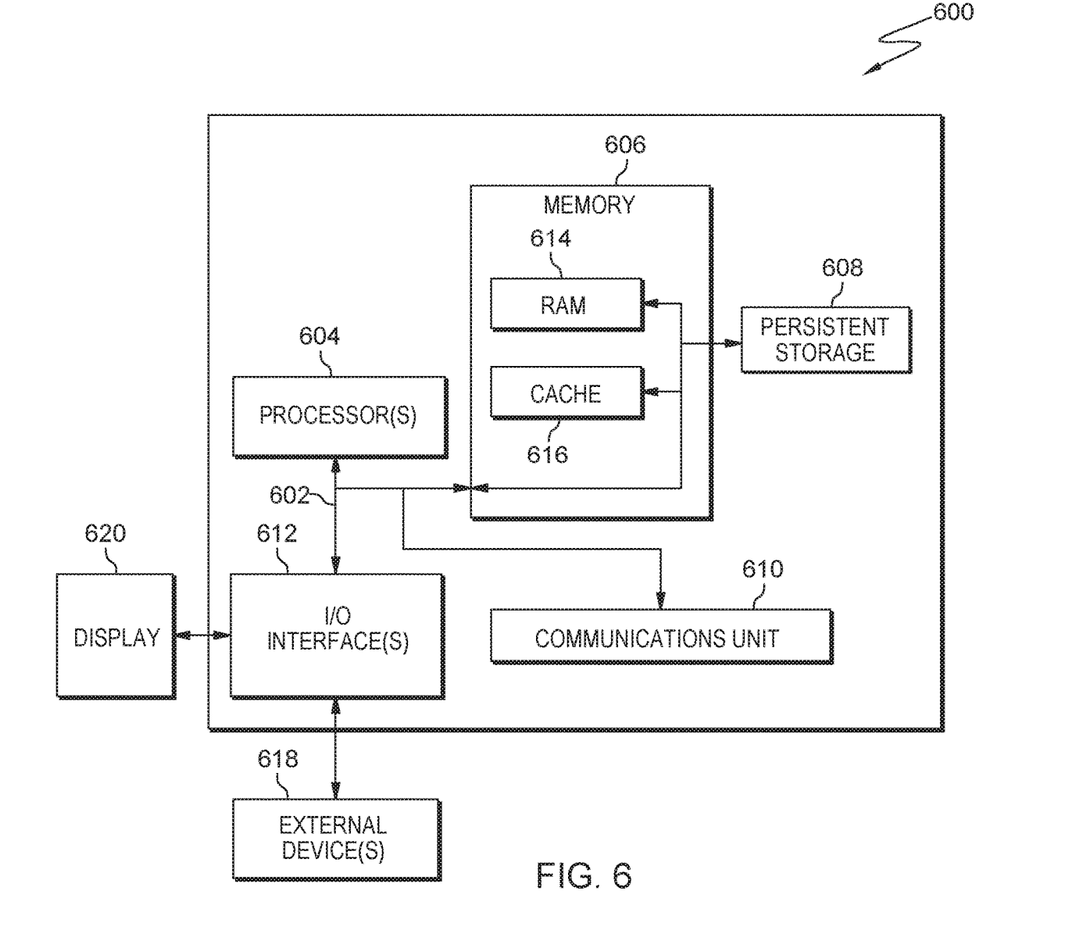
FIG. 6 depicts a block diagram of internal and external components of a computing device, in accordance with an embodiment of the present invention.

FIG. 6 depicts a block diagram of components of a computing device, generally designated 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Program instructions and data used to practice embodiments of the present invention may be stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch display screen, and/or some other suitable input device. External devices 618 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for interactive software demonstrations, the method comprising:

responsive to an initiation of a software demonstration, facilitating, by one or more processors, the software demonstration between a first device and a second device using at least one virtual machine;

communicating, by one or more processors, with a user interface utility which resides in the first device and the second device wherein the user interface utility resides within a software demonstration system;

creating, by one or more processors, a plurality of interfaces between a user of the first device and one or more users of the second device using the user interface utility, wherein the plurality of interfaces provide:

(i) a first button and a second button to the first user of the first device and each of the one or more users of the second device, and (ii) respective displays for the user of the first device and each of the one or more users of the second device;

cloning, by one or more processors, a master virtual machine into one or more cloned virtual machines, wherein the cloned one or more virtual machines are accessible to the one or more users of the second device, and wherein the master virtual machine is accessible to the user of the first device; and allowing, by one or more processors, each of the one or more users of the second device to interact with a plurality of states associated with the software demonstration system on the master virtual machine utilizing the cloned one or more virtual machines, wherein the plurality of states associated with the software demonstration system includes an interactive client software application.

2. The method of claim 1, further comprising:

connecting by one or more processors, to the first device and the second device;

spawning, by one or more processors, the one or more virtual machines on the first device and the second device;

accessing, by one or more processors, the one or more spawned virtual machines which control the software demonstration by using a virtual client; and determining, by one or more processors, a mode of the software demonstration, wherein the mode is an interactive mode or a non-interactive mode.

3. The method of claim 2, further comprising:

displaying, by one or more processors, the first button to pause the software demonstration and the second button to resume the software demonstration, which are viewable to a user of the first device and one or more users of the second device.

4. The method of claim 3, further comprising:

determining, by one or more processors, whether the one or more users of the second device have access to the first button which pauses the software demonstration;

responsive to determining one or more users of the second device have access to the first button, cloning, by one or more processors, a master virtual machine; and responsive to determining the one or more users of the second device do not have access to the first button, operating, by one or more processors, the master virtual machine to control the demonstration, wherein a user of the first device has access to the master virtual machine.

5. The method of claim 4, further comprising:

responsive to determining the mode of the software demonstration is in the non-interactive mode, presenting, by one or processors, the software demonstration using the master virtual machine; and responsive to determining the mode of the software demonstration switches from the interactive mode to the non-interactive mode, destroying, by one or more processors, the at least one cloned virtual machine.

6. The method of claim 3, wherein displaying the first button to pause the software demonstration and the second button to resume the software demonstration, comprises:

responsive to activating the first button, pausing, by one or more processors, the software demonstration in order to initiate the interactive mode; and responsive to activating the second button, resuming, by one or more processors, the paused software demonstration in order to initiate the non-interactive mode.

7. The method of claim 1, wherein creating the plurality interfaces between the user of the first device and the one or more users of the second device, comprises:

associating, by one or more processors, at least one cloned virtual machine with a user among the one or more users of the second device such that one user of the second device explores the software demonstration independently of the other one or more users of the second computing device.

* * * * *